UNITED STATES PATENT OFFICE 2,663,533

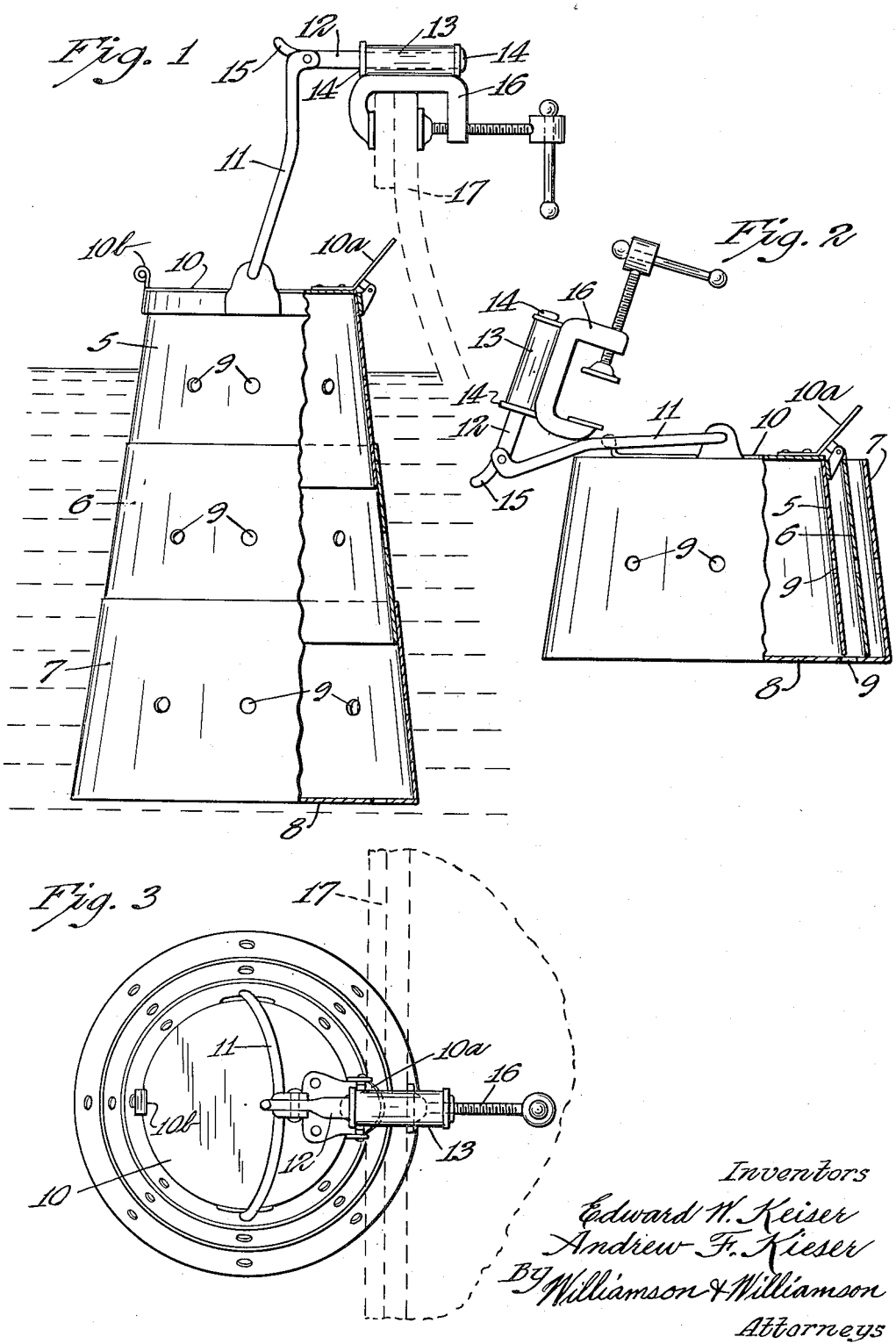

ATTACHMENT ASSEMBLY FOR LIVE BOXES

Edward W. Keiser and Andrew F. Kieser, Minneapolis, Minn.

Application September 30, 1949, Serial No. 118,796

1 Claim. (Cl. 248—284)

This invention relates generally to live boxes and particularly to those of the collapsible type.

Live boxes of various types have been used for many years to keep fish after they have been caught and, in some cases, portable live boxes have been provided which are adapted to be attached to a boat, or other supporting means, and to have a large portion thereof submerged below the surface of the water. Most of these have been relatively cumbersome and have been mounted to permit substantially free swinging movement thereof in the water.

It is an object of our invention to provide a novel and improved live box adapted to be collapsed into relatively compact form for easy transportation and adapted to be quickly set up for use.

It is another object to provide a compactly collapsible live box which is quickly and easily set up and which is adapted to be mounted on the gunwale of a boat or on a dock to suspend said box, the substantial portion thereof submerged in water, to protect and keep fish which have been caught.

More specifically, it is an object to provide a collapsible live box having a plurality of interlocking sections adapted to be nested one within the other when in collapsed position and provided with a mounting bracket adapted to attach said box to a boat or other supporting structure with provision for permitting substantially universal swinging movement of said box while submerged in the water.

These and other objects and advantages of our invention will more fully appear from the following description made in connection with the accompanying drawings wherein like reference characters refer to the same or similar parts throughout the several views and in which:

Fig. 1 is a side elevational view of our live box with a portion of the box cut away and showing a fragmentary portion of a boat in dotted lines to which the mounting bracket is clamped;

Fig. 2 is an elevational view showing the box in collapsed position and having a portion broken away to show fragmentary parts of the nested sections; and Fig. 3 is a top plan view of the assembled structure shown in Fig. 1.

As illustrated in the accompanying drawings, we provide a live box made from a plurality of interlocking sections, such as the sections 5, 6 and 7. Each of the sections, in the form shown, has a frusto-conical shape and when set up forms a frusto-conical shaped box. The lower section 7 has a bottom 8 formed thereon and a plurality of apertures 9 are formed in each of the sections 5, 6 and 7, as well as in the bottom 8. The diameter of the lower extremity of each section is slightly greater than the diameter of the upper diameter of the section exposed below, and the upper sections are respectively disposed within the lower sections as shown and are adapted to be collapsed into nested relation as illustrated in Fig. 2. A hinged top closure 10 is provided on the top section 5, and suitable operating handles 10a and 10b are provided thereon. An attachment stirrup 11 substantially in the shape of an inverted Y has the depending arms thereof pivotally connected to the upper portion of the top section 5 and extends upwardly therefrom. The upper portion of the stirrup 11 is pivotally connected to a shaft 12 which is journaled for oscillation in a suitable bearing which, in the form shown, is the sleeve 13. Suitable means for preventing longitudinal shifting movement of the shaft are provided, such as the collars 14 disposed at each end of the sleeve 13. A stop element 15 is provided to prevent overcenter swinging movement of the stirrup beyond a straight-line relation with the shaft 12. A screw clamp 16 is provided for securely attaching said bracket to a supporting structure, such as the gunwale of a boat 17, shown in dotted lines in Figs. 1 and 3.

When the box is assembled, the sections are initially nested one within the other and thereafter the bottom 8 is securely fixed to the lower portion of the bottom section 7. As best shown in Fig. 1, the upper marginal portion of the lower sections firmly embrace the lower marginal portions of the respectively adjacent upper sections and produce sufficient friction to hold the sections in set-up position, as best shown in Fig. 1. By permitting substantially universal swinging movement of the box in the water, any stress that might be produced in the upper portion of the box or in the mounting bracket is substantially eliminated, thereby eliminating the necessity of any expensive reinforcement in either the bracket or the upper section.

It will be seen that we have provided a relatively simple, highly efficient, live box adapted to be quickly and easily collapsed or set up, and provided with a mounting bracket adapted to permit substantially universal swinging movement of the box while it is suspended, with a portion thereof submerged below the surface of the water.

It will, of course, be understood that various changes may be made in the form, details, arrangement and proportions of the parts without departing from the scope of our invention.

What we claim is:

An attachment assembly particularly constructed for connecting a live box to a boat, said assembly comprising a handle member adapted to be pivotally mounted for swinging movement on the top of the live box, a shaft transversely pivoted to said handle member, a sleeve freely journalling said shaft to permit unrestricted rotation of the shaft therein, thrust resisting means associated with said shaft and said sleeve to prevent longitudinal shifting movement of one relative to the other, all of said pivotal connections permitting unrestricted swinging movement between the respective interconnected members, and a clamping member fixed to said sleeve to securely attach the same to the gunwale of a boat.

EDWARD W. KEISER.
ANDREW F. KIESER.

References Cited in the file of this patent

UNITED STATES PATENTS

| Number | Name | Date |
|---|---|---|
| 161,026 | Grummon | Mar. 23, 1875 |
| 409,852 | Merrill | Aug. 27, 1889 |
| 561,167 | Jennings | June 2, 1896 |
| 657,502 | Swan | Sept. 4, 1900 |
| 741,894 | Durham et al. | Oct. 20, 1903 |
| 785,451 | Tourville | Mar. 21, 1905 |
| 933,216 | Wilson | Sept. 7, 1909 |
| 1,202,761 | Crabtree | Oct. 24, 1916 |
| 1,439,690 | Carpenter | Dec. 26, 1922 |
| 2,272,569 | Luhmann | Feb. 10, 1942 |
| 2,493,203 | Madeksho | Jan. 3, 1950 |
| 2,522,255 | Climo | Sept. 12, 1950 |